US006491582B1

(12) United States Patent
Toyohara et al.

(10) Patent No.: US 6,491,582 B1
(45) Date of Patent: Dec. 10, 2002

(54) VIDEO GAME DEVICE, PLAY CONTROL METHOD FOR VIDEO GAME, AND READABLE RECORDING MEDIUM RECORDING THE METHOD

(75) Inventors: Koji Toyohara, Nishinomiya (JP); Hiroshi Tanibuchi, Nishinomiya (JP); Koji Maeda, Sakai (JP); Fujitomo Narita, Amagasaki (JP)

(73) Assignee: Kabushiki Kaisha Konami Computer Entertainment, Osaka (JP)

( * ) Notice: Subject to any disclaimer, the term of this patent is extended or adjusted under 35 U.S.C. 154(b) by 0 days.

(21) Appl. No.: 09/453,483

(22) Filed: Dec. 9, 1999

(30) Foreign Application Priority Data

Dec. 11, 1998  (JP) .......................... 10-375088

(51) Int. Cl.⁷ .................................. A63F 9/24

(52) U.S. Cl. .............................. 463/1; 463/4

(58) Field of Search ................ 463/1, 4, 8, 3, 463/31, 35, 43, 44

(56) References Cited

U.S. PATENT DOCUMENTS

| 4,711,543 A | | 12/1987 | Blair et al. .................... 352/87 |
| 5,462,275 A | | 10/1995 | Lowe et al. .................... 273/94 |
| 5,885,156 A | * | 3/1999 | Toyohara et al. ............... 463/1 |
| 6,155,924 A | * | 12/2000 | Nakagawa et al. ............ 463/4 |

FOREIGN PATENT DOCUMENTS

| EP | 0844010 | | 5/1998 | |
| JP | 10-71274 | | 3/1998 | |
| WO | 98/43715 | * | 4/1998 | ............. A63F/9/22 |

OTHER PUBLICATIONS

P. Anderson: "NHL 99 (PSX) Review" ONLINE!, Oct. 26, 1998, pp. 1–5, XP002136298 Retrieved from the Internet: <URL:www.sports–gaming.com/hockey/nhl99/review_psx.shtml>retrieved on Apr. 20, 2000!p. 2, paragraph 7—p. 3, paragraph 1.
Official guidebook for Super Formation Succor issued on Feb. 20, 1992.
User's manual for Super Formation Succor 94 Della Serie A SHVC^A95J–JPN issued Mar. 31, 1995.
Official Guide Series Play–by–Play Powerful Pro Baseball by Konami Released Sep. 14, 1998.
Printouts of the scenes viewed on TV monitor when 1(1) is played (which were made by an opponent when the opposition was filed).
"Super Family Computer Official Guidebook, Super Formation Soccer '94 World Cup Final Data" First impression of the first edition published on Nov. 20, 1994, Kabushiki Kaisha Shogakukan (including partial translation).
Game Playing Instruction Manual for a game soft titled "Super Formation Soccer '94 World Cup Final Data" by Human Kabushikikaisha (including partial translation).

(List continued on next page.)

Primary Examiner—Joe H. Cheng
Assistant Examiner—K. Nguyen
(74) Attorney, Agent, or Firm—Jordan and Hamburg LLP

(57) ABSTRACT

A video game device comprises a storing unit for storing one or a plurality of character information (special capabilities, etc.) in the game, an injury event control unit for controlling injury events occuring during the game, a game interrupting control unit for interrupting the game in the event that an injury event occurs, and a game resuming control unit for resuming the game at the point that the injury event ends, so the game player can cause the play character on the screen to preform a simulation experience closer to actual playing. Thus, a video game device wherein the game player can cause a play character on the screen to perform a simulation experience in a manner closer to actually playing the sport can be provided.

24 Claims, 17 Drawing Sheets

OTHER PUBLICATIONS

"Super Formation Soccer Official Guide Book" First impression of the first edition published on Feb. 20, 1992, published by Sanko Printing Kabushiki Kaisha (including partial translation).

"Super Family Computer Strategy Guidebook—Super Formation Soccer 2" First impression of the first edition published on Jul. 29, 1993 by Kazuyoshi Tanaka, publisher: Kabushiki Kaisha Shogakukan (including partial translation).

"98 Koshien Complete Victory Book—Let's join a baseball team!" Published on Jun. 19, 1998 (First Edition); publisher: Digicube Co., Ltd. (including partial translation).

Game Playing Instruction Manual for a game soft titled "High–school Baseball Tournament Simulation '98 Year Koshien" by Maho Kabushikikaisha (including partial translation).

"Game Fan Books 40—Pro Baseball Greatest Nine '97 Guidebook" First impression of the first edition published on Apr. 18, 1997, publisher: Mainichi Communications Co., Ltd. (including partial translation).

"Soccer rules & Judgments" First edition published on Nov. 1, 1997, publisher: Kabushiki Kaisha Taishukan Shoten (including partial translation).

"Introduction to Refereeing" Second Revised Edition: First Edition published Apr. 1986; Second Revised Edition Published Aug. 1998—Fifa Fair Play, Editors: Tokyo Metropolitan Soccer Association Referee Committee (including partial translation).

Video tape containing relevant scenes from a video monitor when "Super Formation Soccer '94 World Cup Final Data" is played and which was made by an Opponent when the Opposition dated Dec. 19, 2000 was filed in Japan.

* cited by examiner

FIG. 9

| | | | ON THE BENCH | | FUKUSHIMA | |
|---|---|---|---|---|---|---|
| EAST TEAM | 1P | PITCHER | AOYAGI | ☹ | BATTING D | THROWS RIGHT, BATS LEFT |
| STARTING ORDER | | | MIKI | ☹ | POWER C | FIELDS OUT-FIELD, THIRD |
| 1 | IIDA ☺ | CENTER-FIELD | FUKUSHIMA | ☺ | RUNNING C | BATTING AVE. .000 |
| 2 | MANAKA ☹ | RIGHT-FIELD | TSUJI | ☹ | THROW-ING C | HOMERUNS 0 |
| 3 | IKEYAMA ☹ | THIRD | SHIROISHI | ☹ | FIELDING B | R.B.I. 0 |
| 4 | FURUTA ☹ | CATCHER | KOBAYAKAWA | ☹ | | |
| 5 | WATARAI ☹ | FIRST | BABA | ☹ | INABA | |
| 6 | DOBASHI ☹ | SECOND | SATO | ☹ | BATTING C | THROWS LEFT, BATS LEFT |
| 7 | INABA ☹ | LEFT-FIELD | ON THE FARM | | POWER D | FIELDS OUT-FIELD, FIRST |
| 8 | MIYAMOTO ☺ | SHORT-STOP | IWAMURA | ☹ | RUNNING B | BATTING AVE. .000 |
| 9 | WATANABE ☺ | PITCHER | KATSUNORI | ☹ | THROW-ING B | HOMERUNS 0 |
| | | | | | FIELDING B | R.B.I. 0 |

FIG. 16

VIDEO GAME DEVICE, PLAY CONTROL METHOD FOR VIDEO GAME, AND READABLE RECORDING MEDIUM RECORDING THE METHOD

BACKGROUND OF THE INVENTION

1. Field of the Invention

The present invention relates to a video game device wherein a play character on the video screen is caused to perform a simulation experience (playing) instead of the player, a play control method for the video game, and a readable recording medium storing the play control method.

2. Description of the Related Art

Conventionally, regarding playing games wherein the player performs a simulation experience as a play character on the video screen, there are known such which include scenes wherein a play character becomes the object of a negative event consisting of being injured during play. In this case, the arrangement is such that it is found out after the play ends that the player was the object of the injury event, and the play character cannot come up for the next play.

However, in such a case with actual play, the sport player either returns to play or is replaced with another sport player depending on the degree of injury treatment, so conventional games have a poor sense of reality, and lacked in interest in that point.

SUMMARY OF THE INVENTION

The present invention has been made in light of the above, and it is an object thereof to provide a video game device whereby a player can cause a play character on the screen to perform a simulation experience closer to actual playing, the play control method for the video game device, and a readable recording medium whereupon is recorded the method thereof.

The video game device according to a first aspect of the invention comprises: a storing means for storing one or a plurality of character information in a game; an injury event control means for controlling injury events in a game; a game interrupting control means for interrupting the game in the event that the injury event occurs; and a game resuming control means for resuming the game in the event that the injury event has ended.

According to this configuration, one or a plurality of character information in a game are stored in a storing means, injury events in a game are controlled by injury event control means, the game is interrupted by game interrupting control means in the event that the injury event occurs, and the game is resumed by the game resuming control means in the event that the injury event has ended. Thus, the player can cause a play character on the screen to perform a simulation experience closer to actual playing, so the game is full of sensations of reality, and is absorbingly interesting.

BRIEF DESCRIPTION OF THE DRAWINGS

FIG. 9 is a diagram illustrating a screen of the video game;

FIG. 16 is another diagram illustrating a screen of the video game; and

DETAILED DESCRIPTION OF THE PREFERRED EMBODIMENTS

Figure 1:
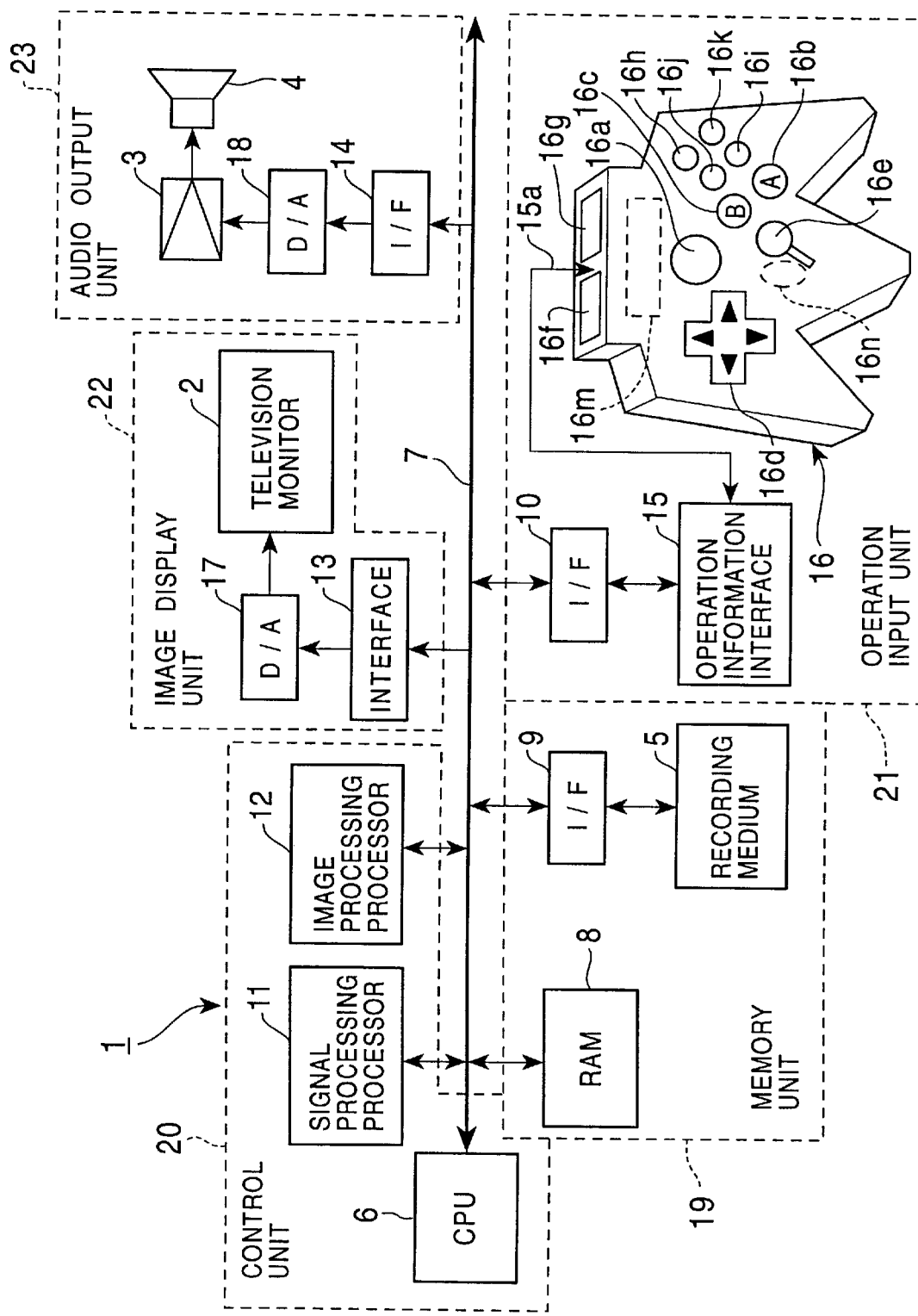
FIG. 1 is a configuration diagram illustrating a game system as an embodiment of the present invention.

FIG. 1 is a configuration diagram illustrating a game system 1 as an embodiment of the present invention.

The game system 1 is comprised of a main game unit, a television monitor 2 which is a display unit for displaying game screens (hereafter referred to as "monitor"), an amplifying circuit 3 and speaker 4 for outputting game audio, and a recording medium 5 whereupon are recorded game programs comprised of image data, sound data and program data. The recording medium 5 consists of a so-called ROM cassette wherein program data such as the above game programs or operating system is recorded in ROM or the like which is stored in a plastic case, or of an optical disk, a flexible disk, etc.

The main game unit is configured such that a bus 7 consisting of an address bus, data bus, and control bus is connected to a CPU 6, and connected to this bus 7 are a RAM 8, an interface circuit 9, interface circuit 10, signal processing processor 11, image processing processor 12, interface circuit 13, and interface circuit 14, with a controller 16 being connected to the interface circuit 10 via an operation information interface circuit 15, a D/A converter 17 being connected to the interface circuit 13, and a D/A converter 18 being connected to the interface circuit 14.

Now, a memory unit 19 is comprised of the above RAM 8, interface circuit 9, and recording medium 5; a control unit 20 for controlling the progressing of the game is comprised of the above CPU 6, signal processing processor 11, and image processing processor 12; an operation input unit 21 is configured of the above interface circuit 10, operation information interface circuit 15, and controller 16; an image display unit 22 is comprised of the above monitor 2, interface circuit 13, and D/A converter 17; and an audio output unit 23 is configured of the above amplifying circuit 3, speaker 4, interface circuit 14, and D/A converter 18.

The signal processing processor 11 performs mainly calculations in three-dimensional space, calculations for performing conversion from positions in three-dimensional space to positions in simulated three-dimensional space, light source calculating processing, and, generating and working processing for sound data.

The image processing processor 12 performs writing processing for image data to be drawn to a display area of the RAM 8, i.e., writing processing of texture data, based on the calculation results from the signal processing processor 11.

The controller 16 has, as an operating portion externally operable, a start button 16*a*, an A button 16*b*, a B button 16*c*, a cross key 16*d*, a stick-type controller 16*e*, a left trigger button 16*f*, a right trigger button 16*g*, a C1 button 16*h*, a C2 button 16*i*, a C3 button 16*j*, a C4 button 16*k*, and a depth trigger button 16*n*, such that operating signals according to the operation contents to the buttons are sent to the CPU 6.

The stick-type controller 16*e* is almost the same configuration as a joystick. That is, it has a vertically erected stick, and is configured such that this stick can be inclined in all directions 360°, including forwards, rear, left and right, with the home position of this stick serving as a pivot, and is arranged such that the X-coordinates in the left and right and the Y-coordinates in the forward and rear directions with the erected position as the position of origin are output to the CPU 6 via the interface circuits 15 and 10, according to the direction of inclining and degree of inclining the stick.

Also, the controller 16 has a connector 16*m* to which card-type memory or the like is attachable for temporarily storing the progression state of the game, for example.

The above game system 1 differs in form according to the use thereof.

That is, in the event that the game system 1 is configured for home use, the monitor 2, amplifying circuit 3, and speaker 4 are separate form the main game unit. Also, in the event that the game system 1 is configured for commercial use, all of the components shown in FIG. 1 are stored in a single integral housing.

Also, in the event that the game system 1 is configured around a personal computer or workstation, the monitor 2 corresponds to the display for the above computer, the image processing processor 12 corresponds to a portion of the game program data recorded in the recording medium 5 or hardware on an expansion board mounted in an expansion slot of the computer, the interface circuits 9, 10, 13, and 14, the D/A coverts 17 and 18, and the operation information interface circuit 15 correspond to hardware on an expansion board mounted in an expansion slot of the computer. Also, the RAM 8 corresponds to the main memory of the computer of various areas in expansion memory.

With the present embodiment, a description will be made with reference to an example of the game system 1 being configured for home use.

Next, description will be made regarding the general actions of the game system 1.

At the time that the power switch (omitted in the Figures) is turned on and power is supplied to the game system 1, the CPU 6 reads game programs consisting of image data, sound data and program data form the recording medium 5, based on the operating system stored in the recording medium 5. Part or all of the read game program is stored in the RAM 8.

Subsequently, the CPU 6 performs progression of the game, based on the game programs stored in the RAM 8, and the contents instructed by the game player via the controller 16. That is, the CPU 6 generates commands as tasks for drawing or sound output as appropriate, based on the operating signals sent out from the controller 16 according to the operation contents of the game player to the controller 16.

The signal processing processor 11 performs calculations of the position and the like of characters in three-dimensional space (of course, this is true for twodimensional space as well) and light source calculations based on the above commands, and also has functions for performing sound data generation processing.

Next, the image processing processor 12 performs writing processing and the like of image data to be drawn on the display area (frame buffer) of the RAM 8, based on the above calculation results. The D/A converter 17 converts the image data written into the RAM 8 into analog image signals at each certain cycle via the interface circuit 13, and displays these as images on the tube screen of the monitor 2.

On the other hand, the sound data output from the signal processing processor 11 is supplied to the D/A converter 18 via the interface circuit 14, and is converted into analog sound signals here, following which is output from the speaker 4 via the amplifying circuit 3 as background sounds, sound effects, and voice.

Next, an overview of the video game executed by the game program recorded in the recording medium 5 will be described, with reference to FIGS. 9 through 17. FIGS. 9 through 17 are diagrams each illustrating a game screen.

With the present video game, pro baseball players (play characters) perform a baseball game, based on the operation of the controller 16 by the player.

Figure 10:
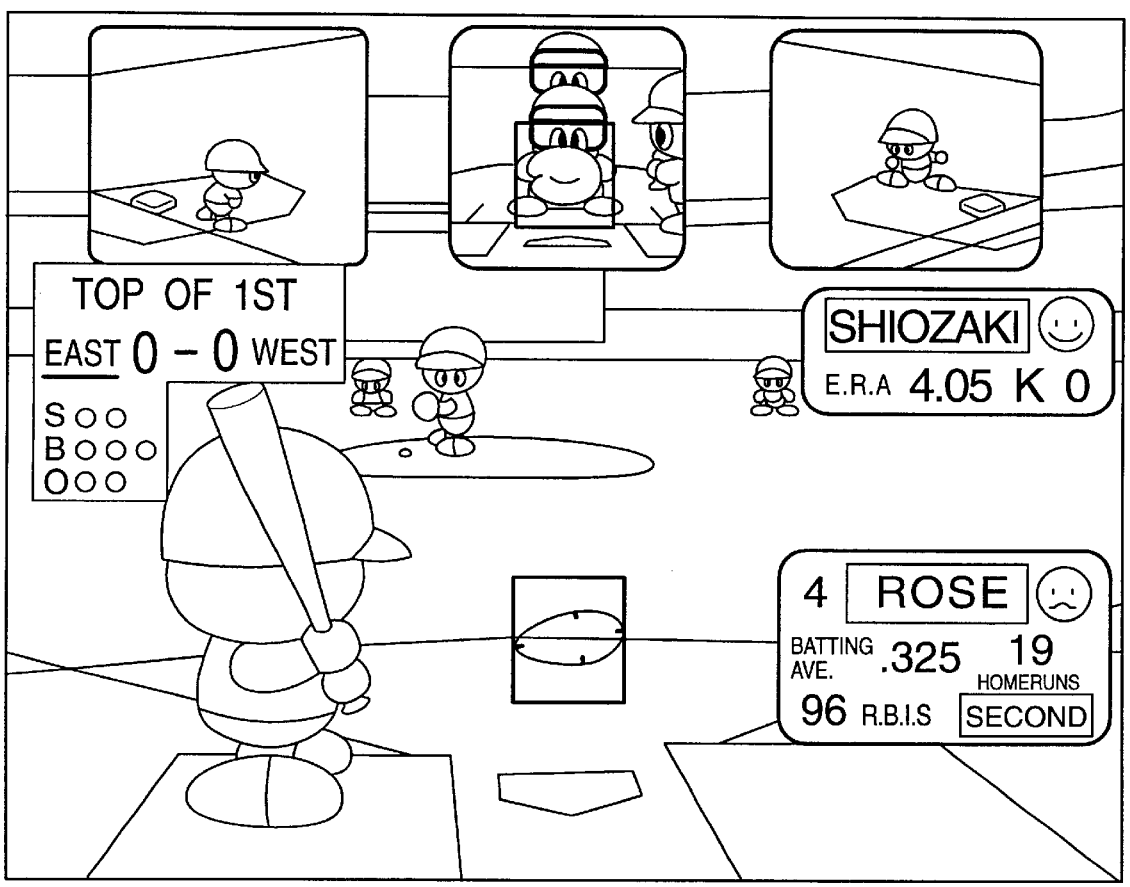
FIG. 10 is another diagram illustrating a screen of the video game.

The players on each team are registered as players who are capable of playing in a game, as shown in FIG. 9. That is, these are displayed as a selectable menu on the screen. Then, based on operation of the operation controller 16 by the player, the player selected from the menu performs the action of standing in the batter's box as a batter in the case of the team at bat, as shown in FIG. 10, waiting for the pitch from the opponent pitcher. Or, the player performs the action of going to base as a runner. The position of the catcher's mitt at this time is displayed at the upper center portion of the screen. Also, in the event that there are runners on base, the runners are displayed at the upper left and right on the screen. The batter starts a batting action regarding the pitched ball.

Also, the starting member players selected from the above menu by operation of the operating controller 16 perform the action of standing on the pitchers mound as a pitcher as shown in the Figure and pitching to the opponent batter, in the case of the fielding team. Or, the player perform the action of scattering to their respective fielding positions as fielders.

The injury event occurs during such actions, according to a certain probability in the state of taking the following injury actions. However, injury events can be caused arbitrarily.

(1) A batter being hit by a pitch.
(2) A batter striking himself with a hit ball.
(3) A pitcher damaging his elbow.
(4) A pitcher being struck by a hard-hit ball.
(5) A runner sliding headfirst.
(6) A runner tackling.
(7) A fielder running into the fence.
(8) A fielder making a diving catch.
(9) A catcher blocking a play.

However, injuries such as the pitcher damaging his elbow in (3) become the object of injury events at a certain probability each time the ball is pitched, but only in the event that the stamina value of that pitcher is 0 or lower. In this case as well, injury events may be generated arbitrarily.

Figure 11:
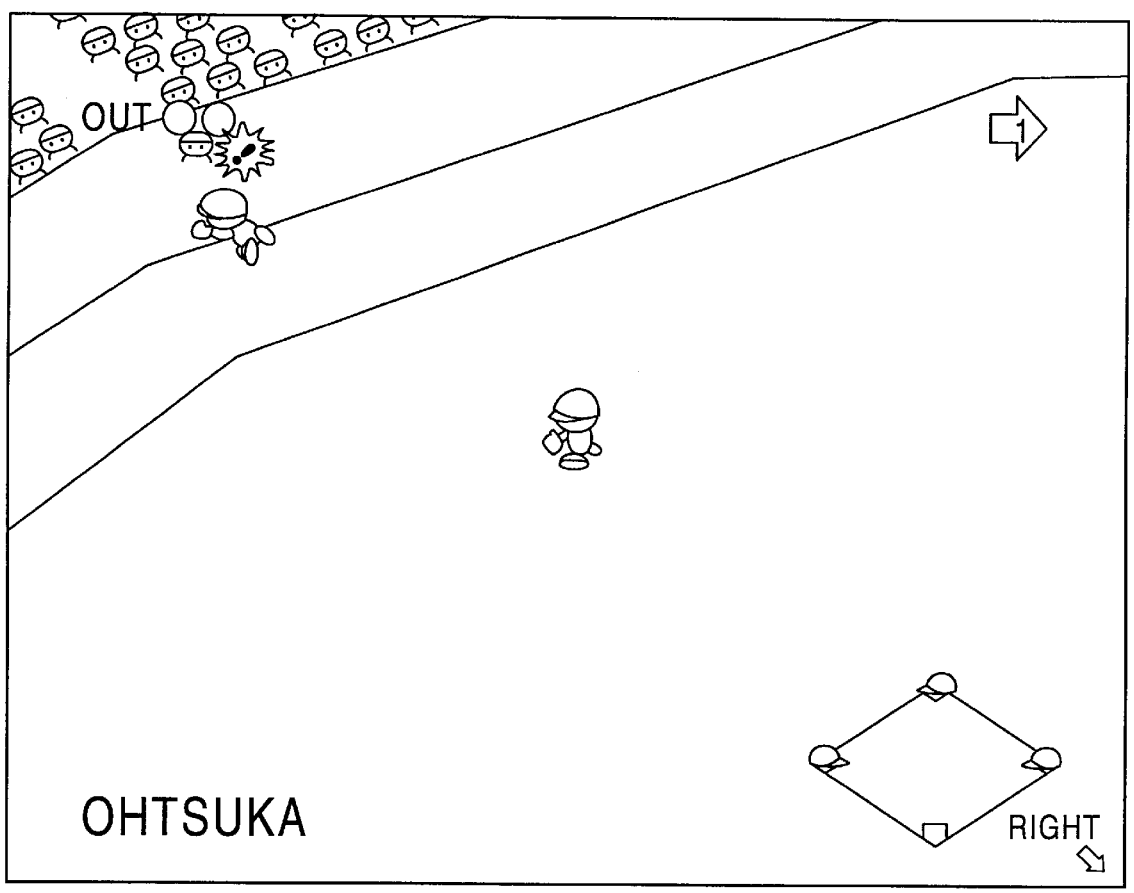
FIG. 11 is another diagram illustrating a screen of the video game.
Figure 12:
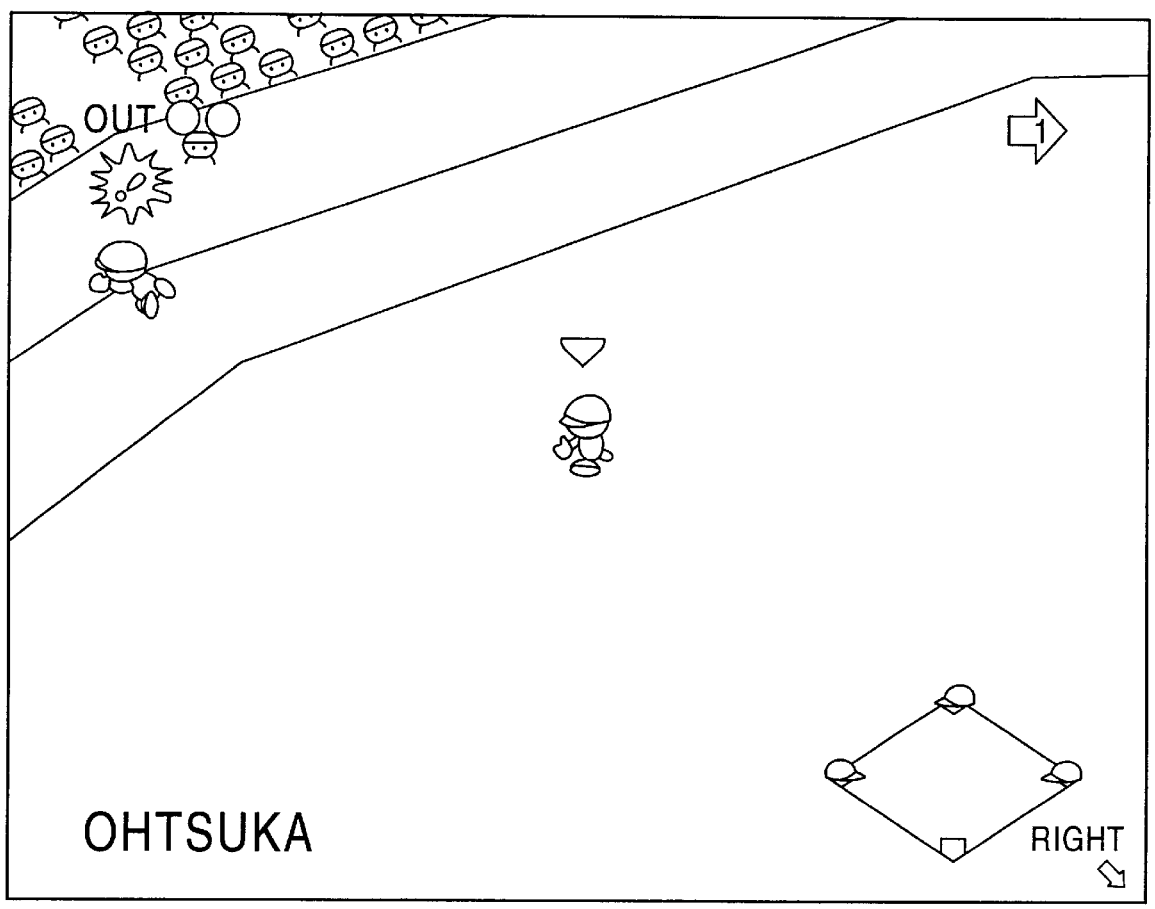
FIG. 12 is another diagram illustrating a screen of the video game.

Also, in the event that conditions such as (3) through (9) occur, an exclamation mark such as shown in FIGS. 11 and 12 is displayed, and whether or not the player is an object of an injury event is displayed by differing the color of the exclamation mark. That is, in FIG. 11, a black exclamation mark is displayed for example, notifying that the player was not the object of an injury event, but with FIG. 12, a red exclamation mark (depicted as an outline for the sake of convenience) for example is displayed, notifying that the player was the object of an injury event. Incidentally, there are no effects of "toughness", which is character information, here.

Next, description will be made regarding the judgment of replacing players due to an injury event.

Figure 13:
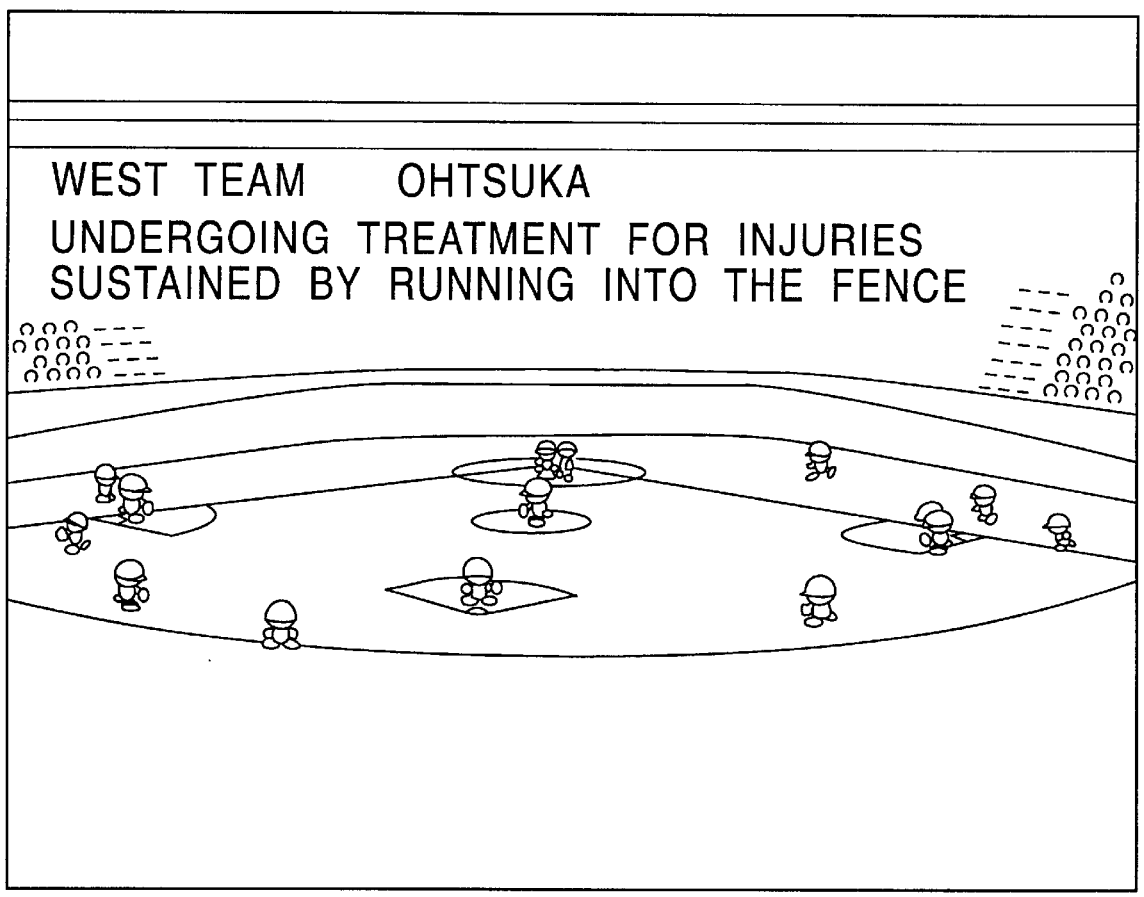
FIG. 13 is another diagram illustrating a screen of the video game.

In the above, in the event that the player is the object of an injury event, that player goes to the bench, and receives treatment. At this time, the status thereof is notified with a display such as shown in FIG. 13. Then, judgement of "continue play" or "replace player" is made based on the conditions by which becoming the object of the injury event was brought about (e.g., degree of injury, etc.). At this time, character information such as "injures easily" is taken into consideration for this judgement.

Figure 14:
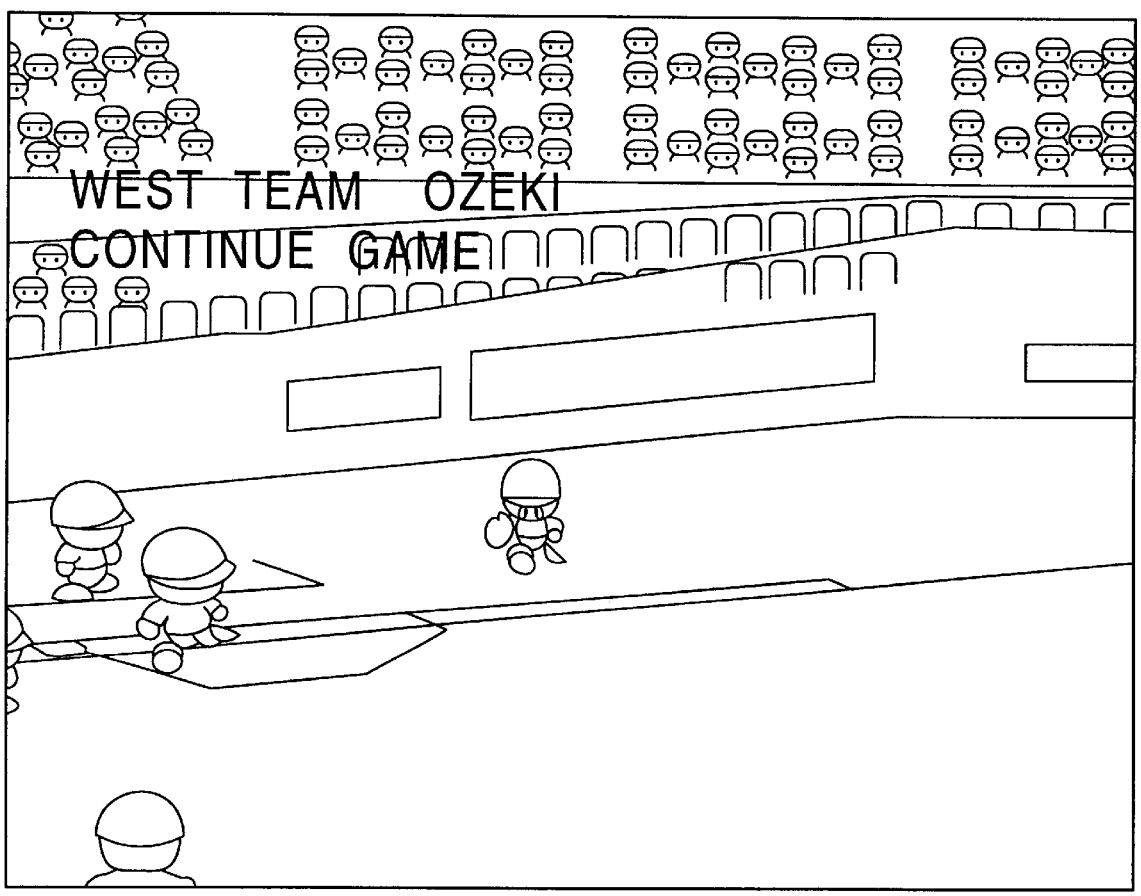
FIG. 14 is another diagram illustrating a screen of the video game.
Figure 15:
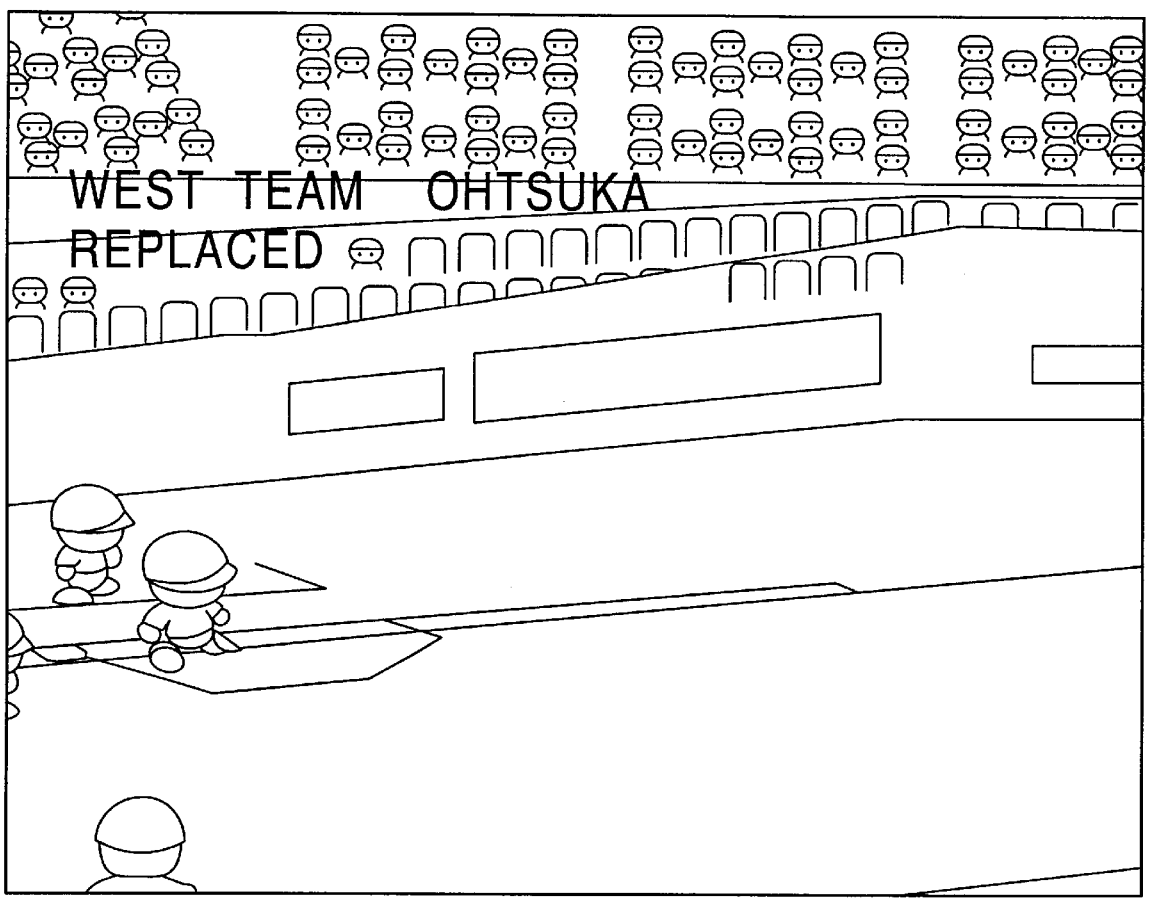
FIG. 15 is another diagram illustrating a screen of the video game.
Figure 16:
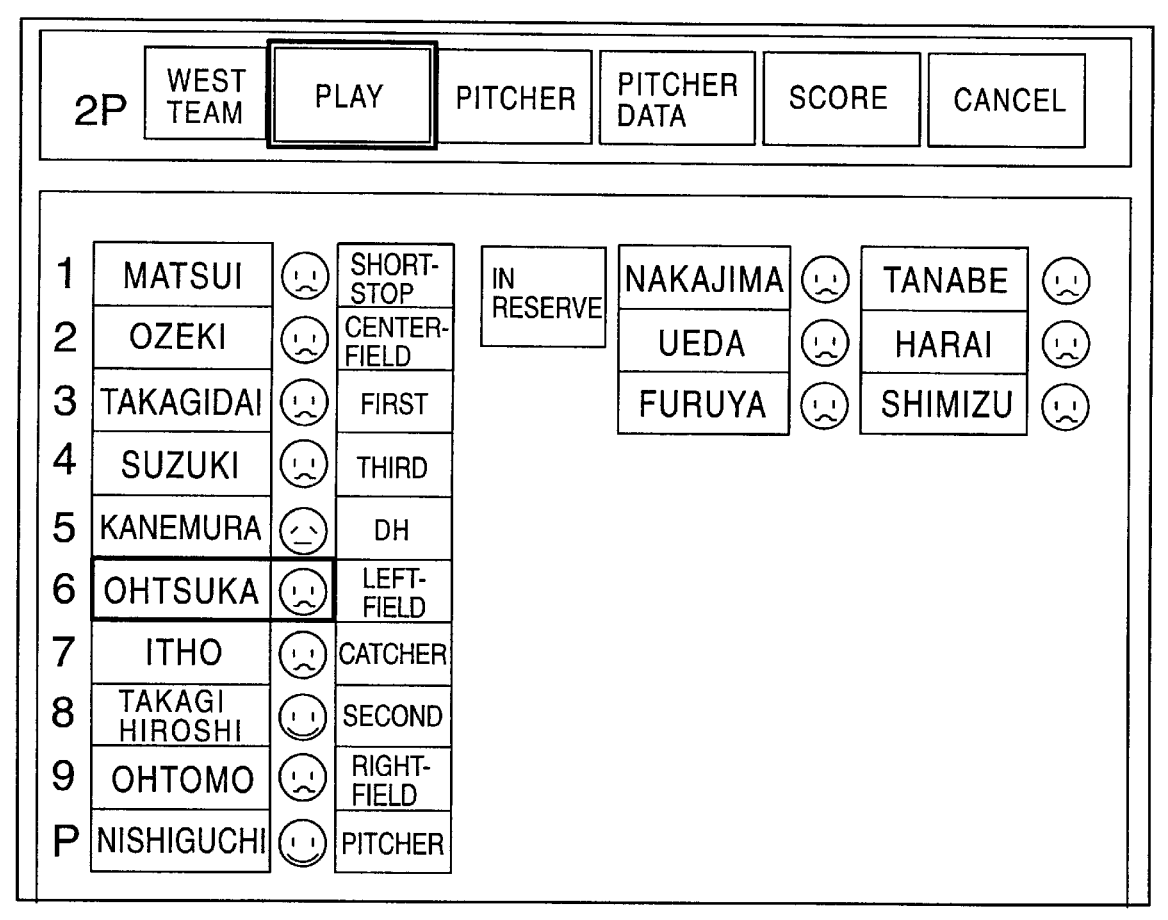

In the case that the judgement is "continue play", the player can return to the game without any effects, and the status thereof is notified by a display such as shown in FIG. 14. On the other hand, in the case that the judgement is "replace player", the player is forcibly replaced, and the status thereof is notified by a display such as shown in FIG. 15. Thus, in the event that the judgement for a certain player is "replace player", that player cannot play in this game any more. At this time, the player is replaced with a screen such as shown in FIG. 16, and the name of the player being replaced changes color, notifying this fact. That is, the name of just that player is displayed red, for example (in the Figure, for sake of convenience, the name of the player "Ohtsuka" to be replaced is surrounded by a broad border).

Next, the effects of the injury event following the game will be described.

That is, in the event that the judgement for a certain player is "replace player" due to injury, the following two types of processing are performed.

(1) The effects of the injury event are minimal, and there are no effects thereof on the next game.

(2) The effects of the injury event are serious, and that player cannot play in several games following that game. At this time, the number of days which that player cannot play is judged based on the effects of "toughness" which is character information for that player. Also, the capabilities of that player deteriorate, depending on the degree of injury.

Figure 2:
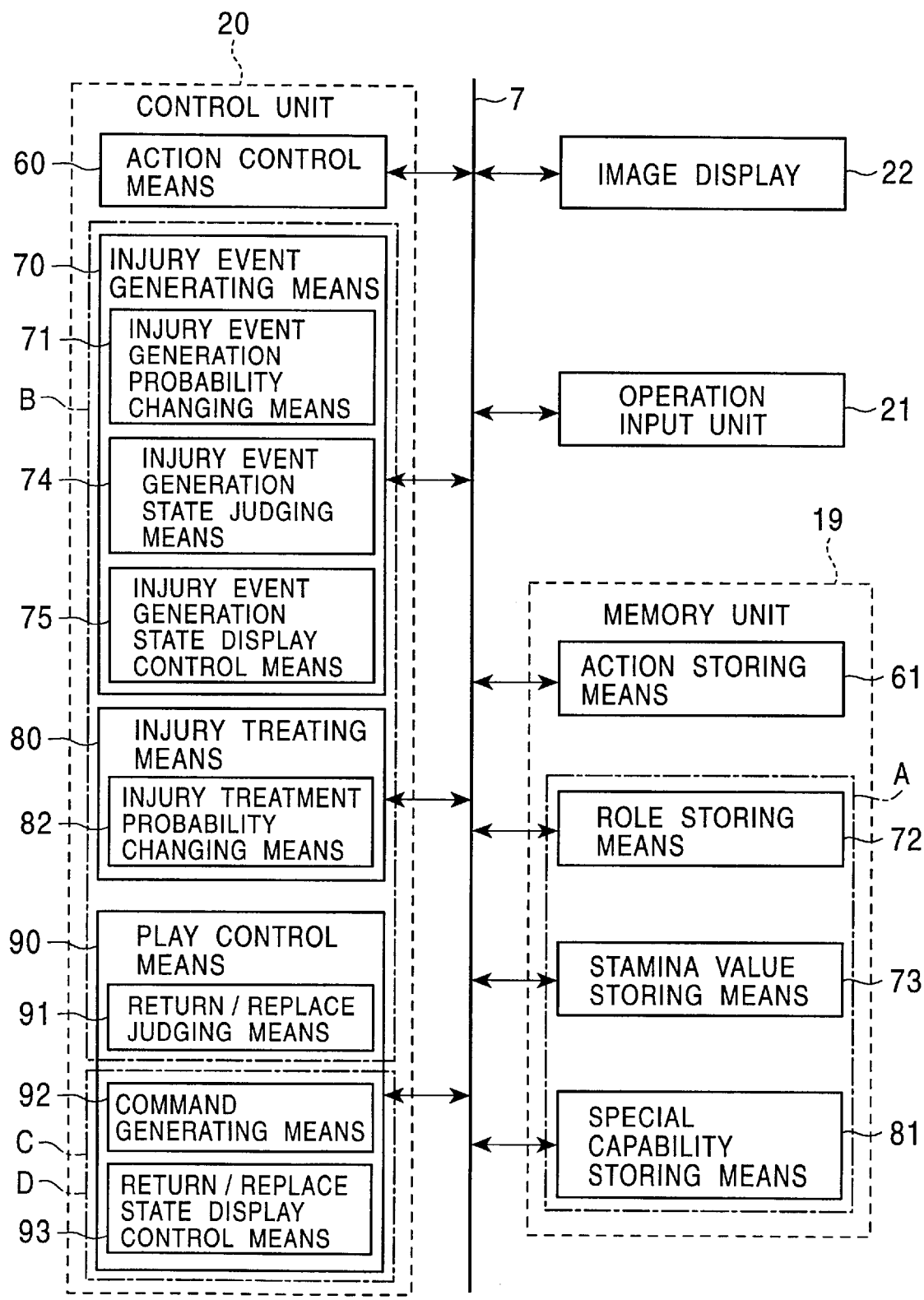
FIG. 2 is a function block diagram for the principal portions of the present device.

FIG. 2 is a function block diagram of the principal portions in the above FIG. 1. Incidentally, though the following description will be made with reference to a baseball game such as described above, in order to facilitate ease of understanding, but it is needless to say that the present invention can be applied to other games in the same manner.

As shown in the Figure, the video game device according to the present embodiment (hereafter referred to as "present device") is provided with storing means A for storing one or a plurality of character information (special capabilities and stamina value of each individual player) in the game, an injury event control means B for controlling injury events occurring during the game, game interrupting control means C for interrupting the game in the event that the injury event occurs, and a game resuming control means D for resuming the game at the point that the injury event ends.

Further, the above injury event control means B may have action detecting means (not shown in the Figure) for detecting actions which would cause injury events to occur, and injury event generation judging means (not shown in the Figure) for judging whether or not an injury event is to be generated in the event that actions which would cause injury events to occur are detected by the action detecting means. Further, the above injury event control means B may have return judging means (not shown in the Figure) for judging whether or not the character which is the object of the injury event is capable of returning to the game. Further, the above return judging means may judge whether or not the character is capable of returning, based on character information.

The present device which has such a configuration is provided with an image display unit (display device) 22 which is a monitor 2 or the like for displaying a sports player for example which is a play character and the action contents thereof, and for displaying menus corresponding to various actions of the sports player, an operating input unit (operating unit) 21 which is an operating controller 16 or the like capable of selectively instructing a menu regarding arbitrary actions from these various menus, an action storing means 61 of a memory unit 19 comprised of a recording medium 5 and the like for storing the action contents of the sports player in a manner corresponding to the operation contents at the operating input unit 21; an action control means 60 of the control unit 20 comprised of the CPU 6 and the like for reading from action storing means 61 the action contents according to the instructions from the operation input unit 21 and causing the play character to perform the same, an injury event generating means 70 for reading out from the action storing means 61 the injury action contents which would serve as a cause of an injury event to occur during playing of the sports player (e.g., struck by a pitch, struck with own hit ball) and causing injury events to occur regarding the sports player in play in a probability manner, a treatment means 80 for treating the character which is the object of the injury event in a probability manner, and a play control means 90 for issuing either a return command to play for the play character or a player replacement command, according to the contents of the treatment.

Further, an arrangement may be made wherein the injury actions contents stored in the action storing means 61 are of multiple types, and an injury event generation probability changing means 71 is provided for changing the probability of the injury event being caused by the injury event generating means 70 is changed according to the instruction results of the injury action contents. Further, an arrangement may be made wherein a role storing means 72 is provided for storing the role of players (e.g., batter, runner, etc.), and this role is taken into consideration by the injury event generating means 70 to generate the above injury. Further, an arrangement may be made wherein a stamina value storing means 73 is provided for storing the stamina value of the player, and wherein the injury event generating means 70 takes the above stamina value into consideration to generate the above injury, only for players of a specific role (e.g., pitcher). Further, the injury event generating means 70 may comprise an injury event generation state judging means 74 for judging whether or not the player has become an object of an injury event based on the above injury action selection contents, and an injury event generation state display control means 75 for performing screen control so as to display the status screen at this time on the above image display unit 22 in the event that the player has been judged to have become an object of an injury event. Further, an special capability storing means 81 for storing special capabilities of the player (e.g., "injures easily") may be provided and an injury treatment probability changing means 82 for changing the treatment probability of the injury of the injury treating means 80 may be provided. Further, the play control means 90 may have a return/replace judging means 91 for judging whether or not the player which has become an object of an injury event is capable of returning to play, based on the treatment contents of the injury treating means 80, and a command generating means 92 for commanding return to play in the event that judgement is made that the player is capable of returning, and for commanding the player to be replaced in the event that judgement is made that the player is not capable of returning. Further, a return/replace state display control means 93 may be provided, such that in the event that the command generating means 92 commands return to play, the play control means 90 displays a screen of the player returning to the ground on the image display unit 22, and that in the event that the command generating means 92 commands replacement, the play control means 90 displays a screen of the player being replaced on the image display unit 22.

Incidentally, the role storing means 72, stamina value storing means 73, and special capability storing means 81 are equivalent to the above storing means A, and are configured within the memory unit 19. Also, the injury event generating means 70, injury event generation probability changing means 71, injury event generation state judging means 74, injury event generation state display control means 75, injury treating means 80, injury treatment probability changing means 82, and the return/replace judging means 91 of the play control means 90 are equivalent to the injury event control means (including action detecting means, injury event generation judging means, and return judging means), and these are constructed within the control unit 20. Further, the command generating means 92 of the play control means 90 and the return/replace state display control means 93 are equivalent to the game interruption control means and game resuming means, and these are constructed within the control unit 20.

Next, the actions of the present device will be described with reference to the flowcharts shown in FIGS. 3 through 8. The video game play control method can be manifested by these actions.

Figure 3:
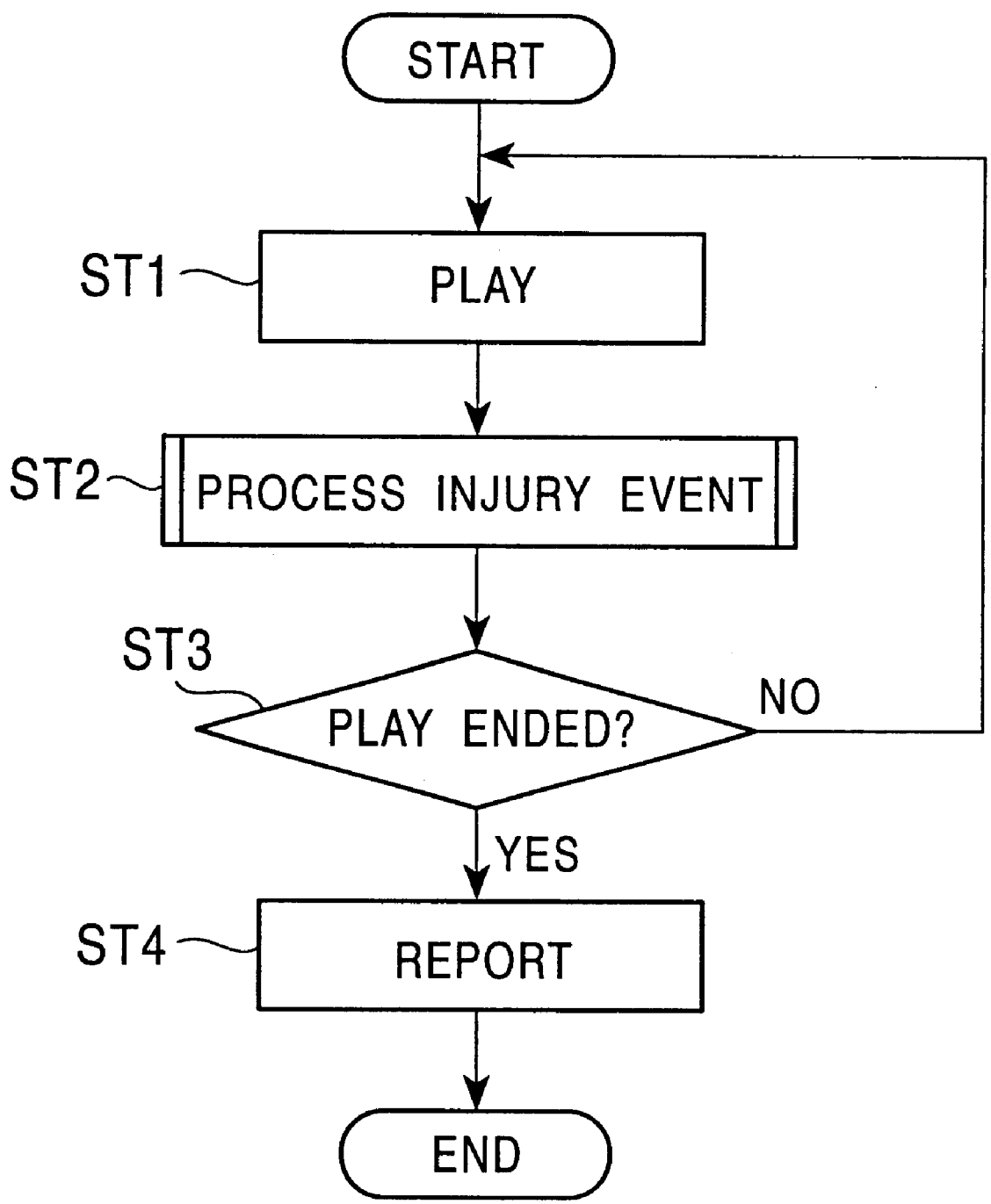
FIG. 3 is a flowchart illustrating the general action of the present device.

First, in FIG. 3, multiple menus are displayed on the video screen, and the operating input unit 21 selects and instructs a desired menu from these. As a result, the action contents corresponding to the selected and instructed menu are executed. Specifically, the play of the baseball game proceeds with the starting member players as described above (step ST1).

At this time, in the event that one of the players in play takes an action based on the operation of the operating controller 16 by the game player which would cause an injury event, the processing thereof is performed according to the injury action contents (step ST2).

(Processing Contents in the Case of Batter ①)

Figure 4:
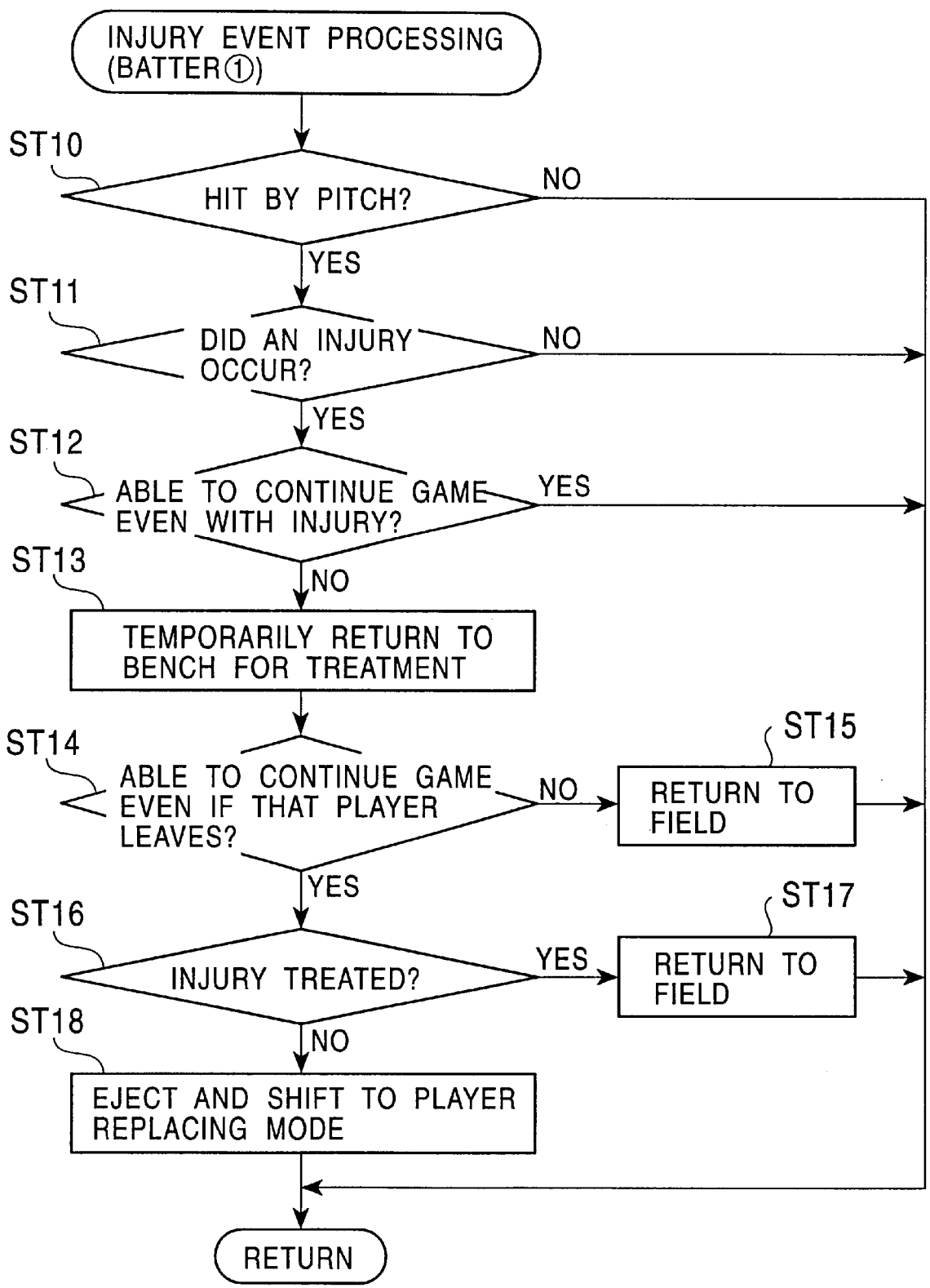
FIG. 4 is another flowchart illustrating the general action of the present device.

For example, let us say that the player is a batter, and is struck with a pitch. The processing at this time is as shown in FIG. 4. That is to say, in the same Figure, the injury event generating means 70 conducts the following processing according to the role ("batter" in this case) of the player stored beforehand by the role storing means 72. Accordingly, the player of the game can enjoy the so-called play according to the role of this player, so a game with absorbing interest can be expected.

Judgement is made by the injury event generation state judging means 74 regarding whether or not an injury event of "batter struck by a pitch" has occurred (step ST10), and in the event that judgment is made that "batter not struck by pitch", the process ends (i.e., returns. This is the same for subsequent flows).

Figure 17:
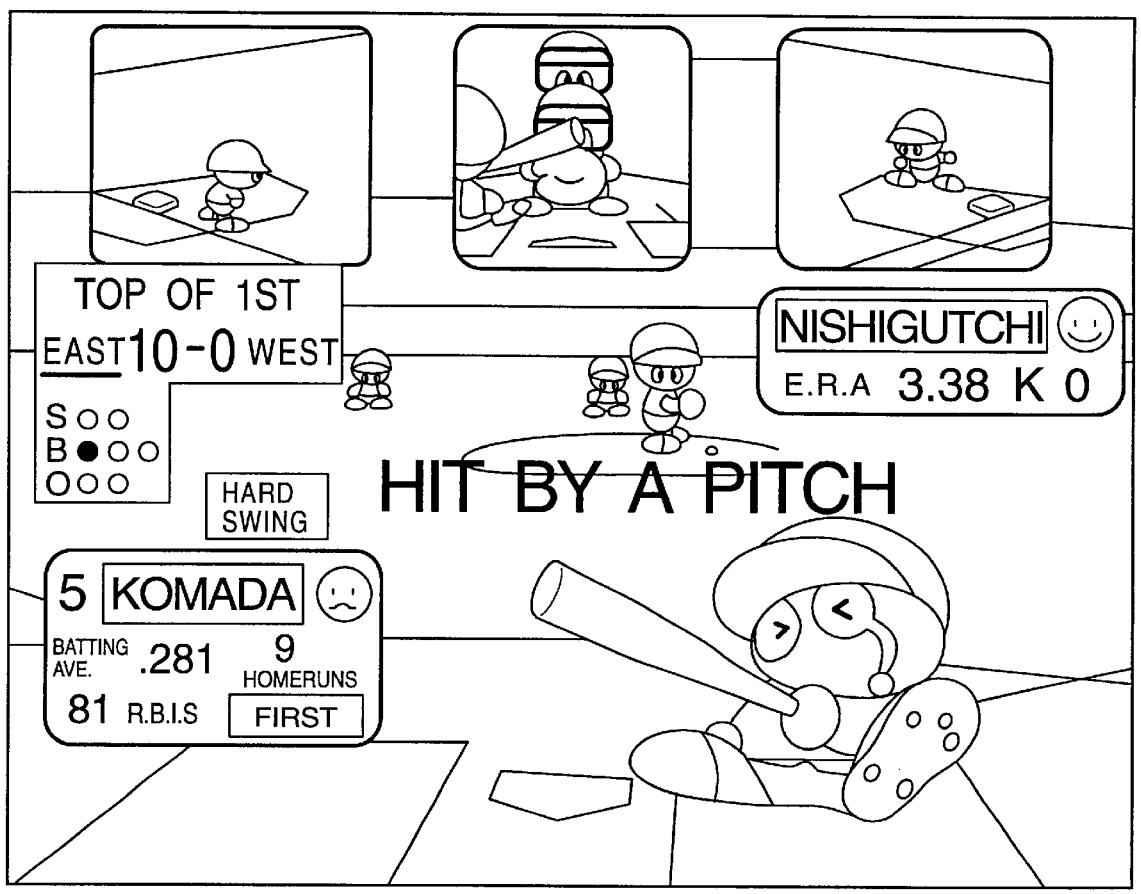
FIG. 17 is yet another diagram illustrating a screen of the video game.

In the event that judgment is made by the injury event generation state judging means 74 that an injury event of "batter struck by a pitch" has occurred, this scene is displayed on the screen by the image display unit 22, via the injury event generation state display control means 75 (for example, FIG. 17 shows a screen in the event that the "struck by a pitch" judgment is made. Screens are displayed for the judgement results in the same manner for other following cases). That is, here, the injury event generation state judging means 74 functions as the action detecting means of the injury event control means B (the same hereafter).

Further, in this case, judgement is made regarding whether the player has become the object of an injury event by the means 74, i.e., regarding "injury occurred?" (Step ST11), and in the event that judgement is made that "injury has not occurred", the process ends. That is, here, the injury event generation state judging means 74 functions as the injury event judging means of the injury event control means B (the same hereafter).

In this way, with the present game, the game player can enjoy plays with the sense of being present.

The probability of injury events occurring is judged by probability using random numbers or the like for example, but the injury event generation probability changing means 71 changes the probability according to the injury action contents of the player, i.e., what sort of play the player made. For example, the probability of an injury event occurring differs between the case of the player being what is called a batter here and a pitcher. Also, even with the same batter, the probability of an injury event happening change differs between this case of being struck by a pitch and the next case wherein the batter is struck by a ball he hit. From this perspective the present game does not become monotonous, and is full of a sense of reality.

In the event that judgment is made by the injury event generation state judging means 74 that an injury has occurred, the same means 74 further judges whether or not the player is capable of continuing play even though the player is the object of an injury event, i.e., judgement regarding whether "the game can continue even with the injury" (step ST12), and in the event that judgment is made that "the player can continue the game since the injury is small", the processing ends.

In the event that the injury event generation state judging means 74 judges that "the game cannot continue", the player which is the object of that injury event temporarily returns to the bench and receives treatment for that injury (step ST13). Following this treatment, judgement is made by the means 74 regarding whether "can the game continue even if that player leaves" (step ST14), and in the event that judgment is made such as "the game cannot continue due to no reserve players or the like", that player returns to the field (step ST15).

In the event that the injury event generation state judging means 74 judges that "the game cannot continue if that player leaves", the above treatment by the injury treating means 80 is taken by the play control means 90 to make judgment regarding whether "the injuries of the player have been treated" (step ST16).

Here, whether treatment has been made is judged with probability of random numbers or the like, but at this time, special capabilities for each player stored beforehand in the special capability storing means 81 are taken into consideration. That is, in the event that the player has special capabilities of "injures easily" or "does not injure easily", the injury treatment probability changing means 82 causes the treatment probability of the injury treatment by the above injury treating means 80 to be advantageous or disadvantageous. From this perspective as well, the present game does not become monotonous, and is full of a sense of reality.

Then, in the event that judgment is made that "the injuries of the player have been treated" by the return/replace judging means 91 of the play control means 90, the player returns to the field by a return command from the command generating means 92 (step ST17). On the other hand, in the event that judgment is made that "the injuries of the player have not been treated" by the return/replace judging means 91 of the play control means 90, the player is forcibly removed by a replace command from the command generating means 92, and the flow proceeds to the player replacing mode (step ST18). These are portrayed on the image display unit 22 by the return/replace state display means 93. That is to say, here, the return/replace judging means 91 functions as the return judging means of the injury event control means B, and the command generating means 92 and return/replace state display control means 93 function as the above game interrupting control means and game resuming control means (the same hereafter).

In this way, returning the player to the field or replacing the player gives the game a further sense of reality, and is more absorbingly interesting. Further, the above returning/replacing judgement of the players differs according to the special capabilities and stamina values and the like of each individual player, so from this perspective as well, the game has a further sense of reality, and is more absorbingly interesting.

(Processing Contents in the Case of Batter ②)

Figure 5:
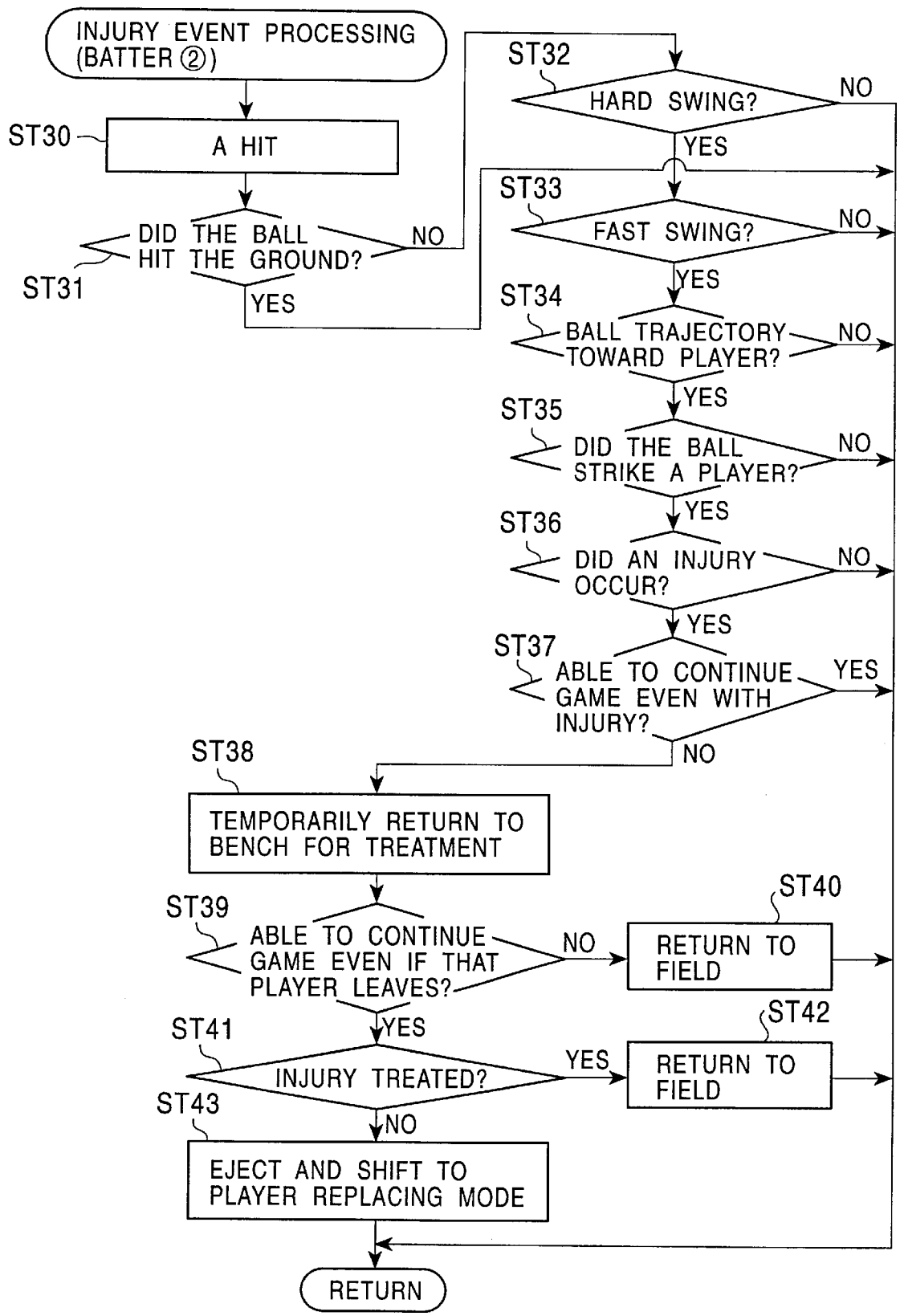
FIG. 5 is another flowchart illustrating the general action of the present device.

For example, let us say that the player is a batter, and is struck with own hit ball. The processing at this time is as shown in FIG. 5. That is to say, in the same Figure, the injury event generating means 70 conducts the following processing according to the role ("batter" in this case) of the player stored beforehand by the role storing means 72.

First, according to instructions and the like from the operating instructing means 21 by the game player, the batter on the screen stands in the batter's box as shown in FIG. 10, and hits the ball which the opposing pitcher throws (step ST30). Next, judgment is made as follows regarding whether or not an injury event has occurred, by the injury event generation state judging means 74. That is, judgment is made regarding whether "the ball hit the ground" (step ST31), and in the event that judgment is made that "the ball hit the ground", the processing ends.

In the event that the judgment is made by the injury event generation state judging means 74 that "the ball did not hit the ground", judgement is made for "hard swing?" (step ST32), and in the event that judgment is made that "not a hard swing", the processing ends.

In the event that the judgment is made by the injury event generation state judging means 74 that "the swing was hard", judgement is made for "fast swing?" (step ST33), and in the event that judgment is made that "a fast swing", the processing ends.

In the event that the judgment is made by the injury event generation state judging means 74 that "the swing was not fast", judgement is made for "ball trajectory toward batter?" (step ST34), and in the event that judgment is made that "the ball trajectory was not toward the batter", the processing ends.

In the event that the judgment is made by the injury event generation state judging means 74 that "the ball trajectory was toward the batter", judgement is made for "did the ball strike the player?" (step ST35), and in the event that judgment is made that "the ball did not strike the player", the processing ends.

In the event that the judgment is made by the injury event generation state judging means 74 that "the ball struck the batter", judgement is made regarding whether or not the player is the object of an injury event i.e., for "did an injury occur?" (step ST36), and in the event that judgment is made that "an injury did not occur", the processing ends.

In the event that the judgment is made by the injury event generation state judging means 74 that "an injury did occur", judgement is made whether "the player is able to continue game even with injury" (step ST37), and in the event that judgment is made of "able to continue game", the processing ends.

In the event that the judgment is made by the injury event generation state judging means 74 that "not able to continue game", the player temporarily returns to the bench and receives treatment for that injury (step ST38). Following this treatment, judgment is made by the means 74 regarding whether "can the game continue even if that player leaves" (step ST39), and in the event that judgment is made that "the game cannot continue", that player returns to the field (step ST40).

In the event that the injury event generation state judging means 74 judges that "the game cannot continue if that player leaves", the above treatment by the injury treating means 80 is taken by the play control means 90 to make judgment regarding whether "the injuries of the player have been treated" (step ST41).

Then, in the event that judgment is made that "the injuries of the player have been treated" by the return/replace judging means 91 of the play control means 90, the player returns to the field by a return command from the command generating means 92 (step ST42). On the other hand, in the event that judgment is made that "the injuries of the player have not been treated" by the return/replace judging means 91, the player is forcibly removed by a player replacing command from the command generating means 92, and the flow proceeds to the player replacing mode (step ST43).

(Processing contents in the case of a pitcher)

Figure 6:
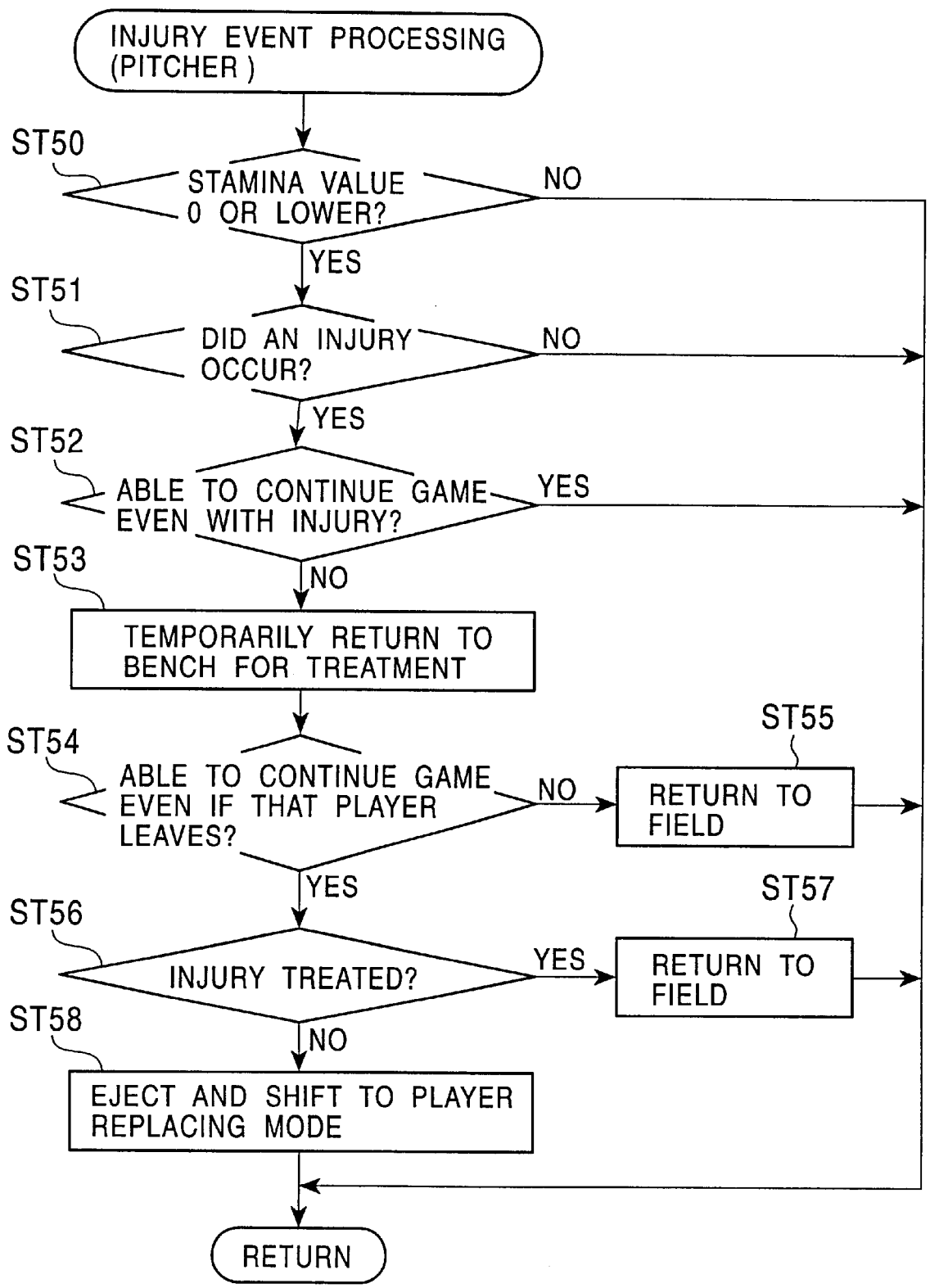
FIG. 6 is another flowchart illustrating the general action of the present device.

For example, let us say that the player is a pitcher, and damages his elbow. The processing at this time is as shown in FIG. 6. That is to say, in the same FIG., the injury event generating means 70 conducts the following processing according to the role ("pitcher" in this case) of the player stored beforehand by the role storing means 72.

The injury event generation state judging means 74 makes reference to the stamina value of the pitcher stored in the stamina value storing means 81 beforehand, and judgement is made whether or not the stamina value is zero or lower (step ST50). In the event that the stamina value is not zero or lower, there is no danger of damaging the elbow, so the process ends. In this way, the game player can enjoy playing according to the individuality of players with certain roles.

In the event that the injury event generation state judging means 74 judges that the stamina value is zero or lower, judgment is made regarding "injured?" (step ST51), and in the event that judgement is made that "no injury occurred", the process ends.

In the event that the judgment is made by the injury event generation state judging means 74 that "an injury did occur", judgement is made whether "the player is able to continue game even with injury" (step ST52), and in the event that judgment is made of "able to continue game", the processing ends.

In the event that the judgment is made by the injury event generation state judging means 74 that "not able to continue game", the player temporarily returns to the bench and receives treatment for that injury (step ST53).

Following this treatment, judgment is made by the means 74 regarding whether "can the game continue even if that player leaves" (step ST54), and in the event that judgment is made that the game cannot continue, that player returns to the field (step ST55).

In the event that the injury event generation state judging means 74 judges that "the game cannot continue if that player leaves", the above treatment by the injury treating means 80 is taken by the play control means 90 to make judgment regarding whether "the injuries of the player have been treated" (step ST56).

Then, in the event that judgment is made that "the injuries of the player have been treated" by the return/replace judging means 91 of the play control means 90, the player returns to the field by a return command from the command generating means 92 (step ST57). On the other hand, in the event that judgment is made that "the injuries of the player have not been treated" by the return/replace judging means 91, the player is forcibly removed by a player replacing command from the command generating means 92, and the flow proceeds to the player replacing mode (step ST58).

(Processing contents in the case of a fielder)

Figure 7:
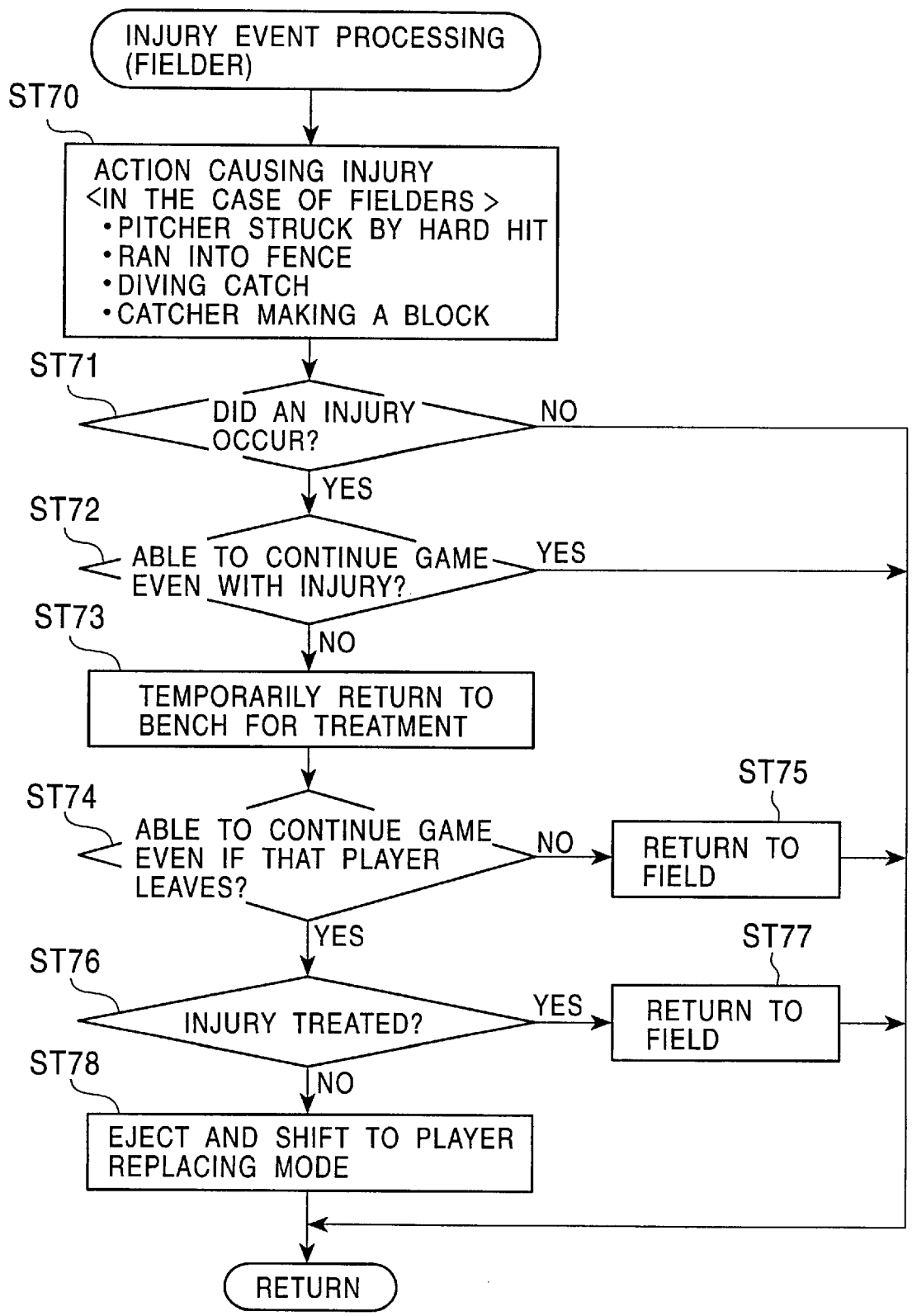
FIG. 7 is another flowchart illustrating the general action of the present device.

For example, let us say that the player is a fielder. The processing at this time is as shown in FIG. 7. That is to say, in the same FIG., the injury event generating means 70 conducts the following processing according to the role ("fielder" in this case) of the player stored beforehand by the role storing means 72.

First, according to instructions and the like from the operating instructing means 21 by the game player, the fielder performs an action which could cause an injury event to occur (step ST70). In the case of fielders, this consists of the-pitcher being struck by a hard hit, running into a fence, making a diving catch, or the catcher making a block, for example. Next, judgment is made by the injury event generation state judging means 74 regarding "injured?" (step ST71), and in the event that judgement is made that "no injury occurred", the process ends.

In the event that the judgment is made by the injury event generation state judging means 74 that "an injury did occur", the scene is portrayed on the image display unit 22 which has received a display command from the injury event generation state display control means 75 (for example, the above FIGS. 11 and 12 are cases where the player has run into the fence). In this case, further judgement is made by the same means 74 whether the player is able to continue game even with the injury (step ST72), and in the event that judgment is made that the player is able to continue the game, the processing ends.

In the event that the judgment is made by the injury event generation state judging means 74 that the player is not able to continue the game, the player temporarily returns to the bench and receives treatment for that injury (step ST73). This scene is portrayed on the image display unit 22 which has received a display command from the injury event generation state display control means 75 (for example, the scene in FIG. 13). Following this treatment, judgment is made by the means 74 regarding whether the game can continue even if that player leaves (step ST74), and in the event that judgment is made that the game cannot continue, that player returns to the field (step ST75). This scene is portrayed on the image display unit 22 which has received a display command from the injury event generation state display control means 75 (for example, the scene in FIG. 14). In the event that the injury event generation state judging means 74 judges that "the game cannot continue if that player leaves", the above treatment by the injury treating means 80 is taken by the play control means 90 to make judgment regarding whether "the injuries of the player have been treated" (step ST76).

Then, in the event that judgment is made that "the injuries of the player have been treated" by the return/replace judging means 91 of the play control means 90, the player returns to the field by a return command from the command generating means 92 (step ST77). This scene is portrayed on the image display unit 22 which has received a display command from the injury event generation state display control means 75 (for example, the same scene as that in the above FIG. 14).

On the other hand, in the event that judgment is made that "the injuries of the player have not been treated" by the return/replace judging means 91, the player is forcibly removed by a player replacing command from the command generating means 92, and the flow proceeds to the player replacing mode (step ST78). This scene is portrayed on the image display unit 22 which has received a display command from the injury event generation state display control means 75 (for example, the scene in FIG. 15). Thus, in this case, a clear screen of the judgement results according to the scene is obtained, and the game has a sense of reality.

(Processing contents in the case of a runner)

Figure 8:
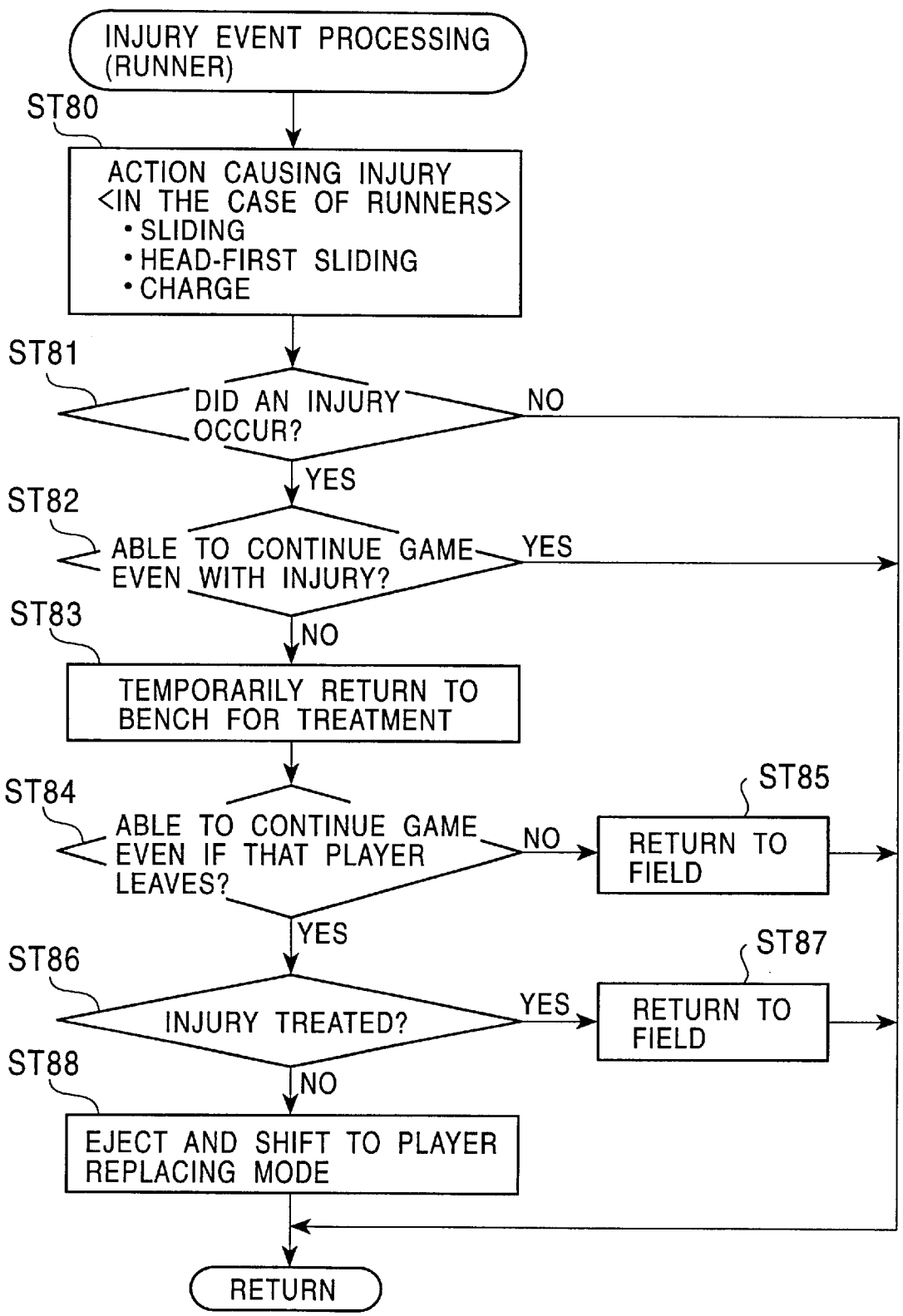
FIG. 8 is another flowchart illustrating the general action of the present device.

For example, let us say that the player is a runner. The processing at this time is as shown in FIG. 8. That is to say, in the same Figure, the injury event generating means 70 conducts the following processing according to the role ("runner" in this case) of the player stored beforehand by the role storing means 72.

First, according to instructions and the like from the operating instructing means 21 by the game player, the runner performs an action which could cause an injury event to occur (step ST80). In the case of runners, this consists of sliding, head-first sliding, and charging. Next, judgment is made by the injury event generation state judging means 74 regarding "injured?" (step ST81), and in the event that judgement is made that "no injury occurred", the process ends.

In the event that the judgment is made by the injury event generation state judging means 74 that "an injury did occur", judgement is made whether "the player is able to continue game even with injury" (step ST82), and in the event that judgment is made of "able to continue game", the processing ends.

In the event that the judgment is made by the injury event generation state judging means 74 that "not able to continue game", the player temporarily returns to the bench and receives treatment for that injury (step ST83). Following this treatment, judgment is made by the means 74 regarding whether "can the game continue even if that player leaves" (step ST84), and in the event that judgment is made that "the game cannot continue", that player returns to the field (step ST85).

In the event that the injury event generation state judging means 74 judges that "the game cannot continue if that player leaves", the above treatment by the injury treating means 80 is taken by the play control means 90 to make judgment regarding whether "the injuries of the player have been treated" (step ST86).

Then, in the event that judgment is made that "the injuries of the player have been treated" by the return/replace judging means 91 of the play control means 90, the player returns to the field by a return command from the command generating means 92 (step ST87). On the other hand, in the event that judgment is made that "the injuries of the player have not been treated" by the return/replace judging means 91, the player is forcibly removed by a player replacing command from the command generating means 92, and the flow proceeds to the player replacing mode (step ST88).

Then, the above steps are continued until the game ends (step ST3 in FIG. 3). Incidentally, following the game, judgement is made regarding whether or not a plurality of days are required for the effects for the injury event to disappear, i.e., for "the injury to completely heal", and the results there of are reported (step ST4 in the same Figure).

In this way, the player of the game can cause play characters on the screen to perform a simulation experience closer to actual play, so the game has a sense of reality, and is absorbingly interesting.

Incidentally, the above processes (step ST1 through ST4 and so forth) are recorded in a readable recording medium as game program data for the present device, and are read out at the time of starting the game and provided to the game.

According to first, third, and fifth aspects of the invention, one or a plurality of character information in a game are stored in a storing means, injury events in a game are controlled by the even controlling means, the game is interrupted by the game interrupting control means in the event that the injury event occurs, and the game is resumed by the game resuming control means in the event that the injury event has ended. Thus, the game player can cause a play character on the screen to perform a simulation experience closer to actual playing, so the game is full of sensations of reality, and is absorbingly interesting.

Further, an arrangement may be made wherein the injury event control means comprises: an action detecting means for detecting action which would serve as a cause of an injury event to occur; and an injury event generation judging means for judging whether or not to generate an injury event in the event that an action which would serve as a cause of an injury event to occur has been detected by the action detecting means; which would allow the game player to enjoy playing with a sense of reality, and absorbingly interesting playing can be expected.

Further, an arrangement may be made wherein the injury event control means comprises a return judging means for judging whether or not the character which is the object of the injury event is capable of returning to the game; which would allow the game player to enjoy playing with a further sense of reality, and even more absorbingly interesting playing can be expected.

Further, an arrangement may be made wherein the return judging means judges whether or not the character is capable of returning, based on character information; which would allow the game player to enjoy playing with a further sense of reality, and even more absorbingly interesting playing can be expected.

Further, according to the second, fourth, and sixth aspects of the invention, a plurality of menus are displayed on a video screen, and an operating unit selectively instructs a desired menu therefrom. As a result, action contents corresponding to the menu selected and instructed are executed. At this time, injury action contents which would cause injury during play of the play character are read from the action storing means. An injury event is caused to occur regarding the play character in play in a probability manner, the above injured play character is treated in a probability manner, and either a return command to play for the play character or a player replacement command is issued according to the contents of the treatment. Thus, the game player can cause a play character on the screen to perform a simulation experience closer to actual playing, so the game is full of sensation of reality, and is absorbingly interesting.

Further, an arrangement may be made wherein multiple types of injury action contents stored in the action storing means exist, and further comprising injury event generation probability changing means so that the generation probability of injury events by the injury event generating means is changed according to the instruction results of the injury action selection contents, which prevents the game from becoming monotonous, and is absorbingly interesting.

Further, an arrangement may be made comprising a role storing means for storing the role of the play character, wherein the injury event generating means generates the injury events taking this role into consideration, so the game player can enjoy role-playing according to the role of the play characters, and thus absorbingly interesting playing can be expected.

Further, an arrangement may be made comprising stamina value storing means for storing stamina values of the play character, wherein the injury event generating means generates the injury events taking the stamina value into consideration, only for play characters of specific roles, so the game player can enjoy role-playing according to the individuality of the play character having this specific role, and thus absorbingly interesting playing can be expected.

Further, an arrangement may be made wherein the event generating means comprises: an injury judging means for judging whether or not the play character has become the object of an injury event, based on the injury action selection contents; and an injury state display control means which performs screen control so as to display the status screen at this time on the display unit in the event that the play character has been injured; so that a clear screen of the judgement results according to each scene is obtained, and the game has a sense of reality.

Further, an arrangement may be made comprising special capability storing means for storing special capabilities of the play character, and comprising an injury treatment probability changing means for changing the treatment probability of the injury event by the injury treatment means based on the special capabilities, thereby preventing the game from becoming monotonous, but rather absorbingly interesting.

Further, an arrangement may be made wherein the play control means comprises: return/replace judging means for judging whether or not the injured play character is capable of returning to play or not, based on the treatment contents by the injury treating means; and command generating means for issuing a command to return to play in the event that judgement has been made that the play character is capable of returning to play, and issuing a command to replace in the event that judgement has been made that the play character is not capable of returning to play; so the game is full of sensation of reality, and is absorbingly interesting.

Further, an arrangement may be made wherein the play control means further comprises a return/replace display control means which performs screen control for displaying a screen of the play character returning on the display unit in the event that a command to return has been issued by the command generating means, and for displaying a screen of the play character being replaced on the display unit in the event that a command to replace has been issued by the command generating means; so a clear screen of the judgement results according to each scene is obtained, and the game has a sense of reality.

What is claimed is:

1. A video game device, comprising:

a display device for displaying a play character and action contents thereof, and for displaying menus corresponding to various actions of the play character;

an operating unit capable of selectively instructing a menu regarding arbitrary actions from said various menus;

action storing means for storing the action contents of the play character in a manner corresponding to operation contents at said operating unit;

action control means for reading the action contents according to the instructions from said operation unit, from said action storing means, and causing the play character to perform actions according to the action contents;

an injury event generating means for reading out from said action storing means injury action contents which would serve as a cause of an injury event to occur during playing of the play character, and causing injury events to occur regarding the play character in play in a probability manner;

an injury treatment means for treating the character which is the object of the injury event in a probability manner; and a play control means for issuing either a return command to play for the play character or a player replacement command, according to contents of said treatment.

2. A video game device according to claim 1, further comprising injury event generation probability changing means, wherein multiple types of injury action contents stored in said action storing means exist, and the generation probability of injury events by said injury event generating means is changed according to the instruction results of said injury action contents.

3. A video game device according to claim 1, comprising a role storing means for storing the role of the play character, wherein said injury event generating means generates said injury events taking this role into consideration.

4. A video game device according to claim 2, comprising a role storing means for storing the role of the play character, wherein said injury event generating means generates said injury events taking this role into consideration.

5. A video game device according to claim 3, further comprising stamina value storing means for storing stamina values which is character information of the play character, wherein said injury event generating means generates said injury events taking said stamina value into consideration, only for play characters of specific roles.

6. A video game device according to claim 1, said injury event generating means comprising:

an injury judging means for judging whether or not the play character has become the object of an injury event, based on the instruction results of said injury action contents; and an injury state display control means which performs screen control so as to display the status screen at this time on said display unit in the event that the play character has been judged to have become the object of an injury event.

7. A video game device according to claim 2, said injury event generating means comprising:

an injury judging means for judging whether or not the play character has become the object of an injury event, based on the instruction results of said injury action contents; and an injury state display control means which performs screen control so as to display the status screen at this time on said display unit in the event that the play character has been judged to have become the object of an injury event.

8. A video game device according to claim 3, said injury event generating means comprising:

an injury judging means for judging whether or not the play character has become the object of an injury event, based on the instruction results of said injury action contents; and an injury state display control means which performs screen control so as to display the status screen at this time on said display unit in the event that the play character has been judged to have become the object of an injury event.

9. A video game device according to claim 5, said injury event generating means comprising:

an injury judging means for judging whether or not the play character has become the object of an injury event, based on the instruction results of said injury action contents; and an injury state display control means which performs screen control so as to display the status screen at this time on said display unit in the event that the play character has been judged to have become the object of an injury event.

10. A video game device according to claim 1, further comprising special capability storing means for storing special capabilities which is character information of the play character, and comprising an injury treatment probability changing means for changing the treatment probability of the injury event by said injury treatment means based on said special capabilities.

11. A video game device according to claim 2, further comprising special capability storing means for storing special capabilities which is character information of the play character, and comprising an injury treatment probability changing means for changing the treatment probability of the injury event by said injury treatment means based on said special capabilities.

12. A video game device according to claim 3, further comprising special capability storing means for storing special capabilities which is character information of the play character, and comprising an injury treatment probability changing means for changing the treatment probability of the injury event by said injury treatment means based on said special capabilities.

13. A video game device according to claim 5, further comprising special capability storing means for storing special capabilities which is character information of the play character, and comprising an injury treatment probability changing means for changing the treatment probability of the injury event by said injury treatment means based on said special capabilities.

14. A video game device according to claim 6, further comprising special capability storing means for storing special capabilities which is character information of the play character, and comprising an injury treatment probability changing means for changing the treatment probability of the injury event by said injury treatment means based on said special capabilities.

15. A video game device according to claim 1, said play control means comprising:

return/replace judging means for judging whether or not the play character which is the object of the injury event is capable of returning to play, based on the treatment contents by said injury treating means; and command generating means for issuing a command to return to play in the event that judgement has been made that the play character is capable of returning to play, and issuing a command to replace in the event that judgement has been made that the play character is not capable of returning to play.

16. A video game device according to claim 2, said play control means comprising:

return/replace judging means for judging whether or not the play character which is the object of the injury event is capable of returning to play, based on the treatment contents by said injury treating means; and command generating means for issuing a command to return to play in the event that judgement has been made that the play character is capable of returning to play, and issuing a command to replace in the event that judgement has been made that the play character is not capable of returning to play.

17. A video game device according to claim 3, said play control means comprising:

return/replace judging means for judging whether or not the play character which is the object of the injury event is capable of returning to play, based on the treatment contents by said injury treating means; and command generating means for issuing a command to return to play in the event that judgement has been made that the play character is capable of returning to play, and issuing a command to replace in the event that judgement has been made that the play character is not capable of returning to play.

18. A video game device according to claim 5, said play control means comprising:

return/replace judging means for judging whether or not the play character which is the object of the injury event is capable of returning to play, based on the treatment contents by said injury treating means; and command generating means for issuing a command to return to play in the event that judgement has been made that the play character is capable of returning to play, and issuing a command to replace in the event that judgement has been made that the play character is not capable of returning to play.

19. A video game device according to claim 6, said play control means comprising:

return/replace judging means for judging whether or not the play character which is the object of the injury event is capable of returning to play, based on the treatment contents by said injury treating means; and command generating means for issuing a command to return to play in the event that judgement has been made that the play character is capable of returning to play, and issuing a command to replace in the event that judgement has been made that the play character is not capable of returning to play.

20. A video game device according to claim 10, said play control means comprising:

return/replace judging means for judging whether or not the play character which is the object of the injury event is capable of returning to play, based on the treatment contents by said injury treating means; and command generating means for issuing a command to return to play in the event that judgement has been made that the play character is capable of returning to play, and issuing a command to replace in the event that judgement has been made that the play character is not capable of returning to play.

21. A video game device according to claim 15, said play control means further comprising a return/replace display control means for performing screen control so as to display a screen of the play character returning on said display unit in the event that a command to return has been issued by said command generating means, and for displaying a screen of the play character being replaced on said display unit in the event that a command to replace has been issued by said command generating means.

22. A play control method for a video game device, comprising:

displaying on a display device a play character and action contents thereof, and displaying menus corresponding to various actions of the play character;

selectively instructing on an operating unit a menu regarding arbitrary actions from said various menus;

storing the action contents of the play character on action storing means in a manner corresponding to operation contents at said operating unit; and reading the action contents on action control means according to the instructions from said operation unit, from said action storing means, and causing the play character to perform actions according to the action contents;

wherein injury action contents which would serve as a cause of an injury event to occur during playing of the play character are read out from said action storing means, and injury events regarding the play character in play are caused to occur in a probability manner, the character which is the object of the injury event is treated in a probability manner, and either a return command to play for the play character or a player replacement command is issued according to the contents of said treatment.

23. A readable recording medium recording a play control method for a video game device, comprising:

displaying a play character and action contents of the play character and displaying menus corresponding to various actions of the play character;

selectively instructing a menu regarding arbitrary actions from said various menus;

storing the action contents of the play character in a manner corresponding to operation contents at said operating unit; and reading the action contents according to the instructions from said operation unit, from said action storing means, and causing the play character to preform actions according to the action contents;

wherein injury action contents which would serve as a cause of an injury event to occur during playing of the play character are read out from said action storing means, and injury events are caused to occur regarding the play character in play in a probability manner, the play character which is the object of the injury event being treated in a probability manner, and return command being issued to play for the play character, or a player replacement command, according to the contents of said treatment.

24. A video game device, comprising:

a display device for displaying a play character and action contents thereof, and for displaying menus corresponding to various actions of the play character;

an operating unit capable of selectively instructing a menu regarding arbitrary actions from said various menus;

action storing means for storing the action contents of the play character in a manner corresponding to operation contents at said operating unit;

action control means for reading the action contents according to the instructions from said operation unit, from said action storing means, and causing the play character to perform actions according to the action contents;

an injury event generating means for reading out from said action storing means injury action contents which would serve as a cause of an injury event to occur during playing of the play character, and causing injury events to occur reguarding the play character in play in a probability manner;

an injury treatment means for treating the character which is the object of the injury event in a probability manner;

a play control means for issuing one of a return command to play for the play character, a player replacement to play for the play character, and a player replacement command, according to contents of said treatment; and special capability storing means for storing special capabilities which is character information of the play character, and including an injury treatment probability changing means for changing the treatment probability of the injury event by said injury treatment means based on said special capabilities.

* * * * *